July 8, 1952
N. E. FAZENBAKER
2,602,550
CLOTHESLINE AND CLOTHESPIN COMBINATION
Filed Feb. 9, 1949
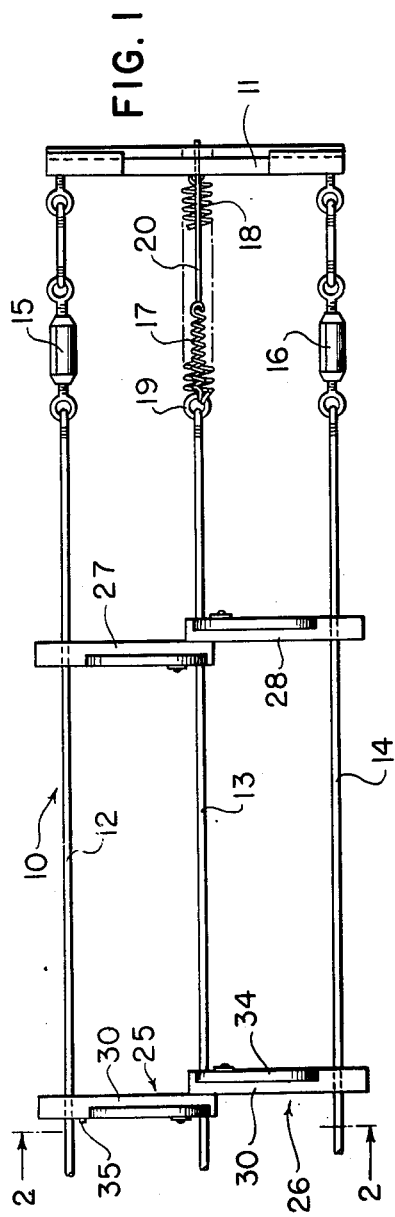
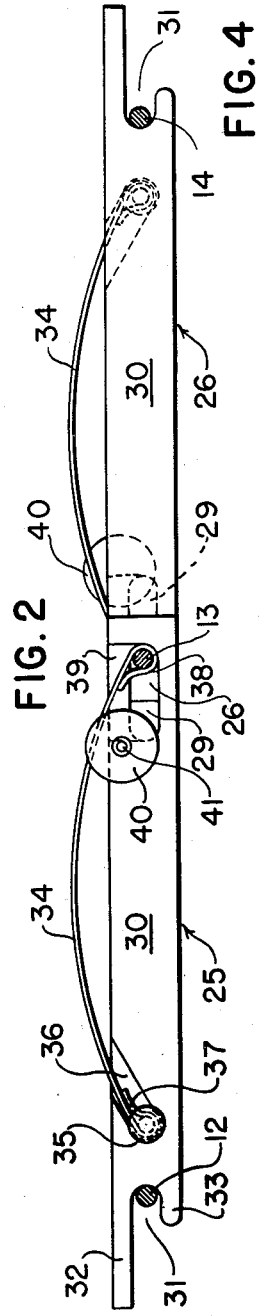
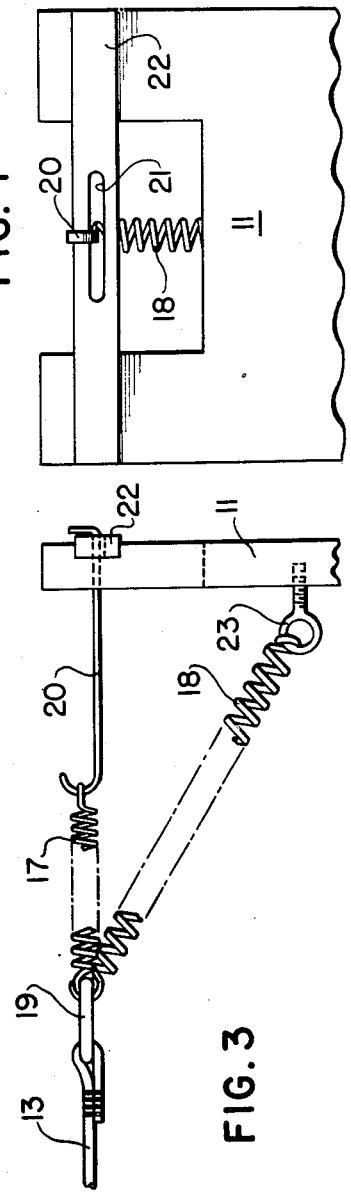
Norris E. Fazenbaker
*INVENTOR.*

Patented July 8, 1952

2,602,550

UNITED STATES PATENT OFFICE 2,602,550

CLOTHESLINE AND CLOTHESPIN COMBINATION

Norris Evers Fazenbaker, West New York, N. J.

Application February 9, 1949, Serial No. 75,320

3 Claims. (Cl. 211—119.13)

The present invention relates to a clothesline and a clothespin, and more particularly to a system comprising a plurality of lines held under tension and clothespins permanently connected to one line and adapted to fasten clothes to the other line more securely and conveniently than conventional clothespins can do.

An object of the present invention is to provide a system of clothesline and clothespin in which the pins are always in position ready for use, and need not be separately stored.

A further object is the provision of a more durable clothespin than the one which has enjoyed leading popularity for many years past, and in which resilient legs extend integrally from a wooden body, and grip the clothes by being pushed down over the clothes and line, thereby spreading the legs apart. Such a conventional pin almost invariably fails by one of the legs splitting off from the body.

Another and further object of the invention is the provision of a clothespin comprising means for gripping clothes, which means is independent of any compressive action on the clothes resulting from their being placed between the two legs of the pin.

In accomplishing the objects of the present invention, means are provided for maintaining a plurality of clotheslines, at least two in number but preferably three, under tension and substantially parallel and in a common plane. It is recommended that in a three line system, the outer lines be tensioned by turnbuckles and the center line be tensioned by a system of springs to be described hereafter.

A plurality of identical clothespins are strung along the center line, the line passing through an elongated hole extending transversely of the pin near one end thereof. The elongated body of the pin is non-resilient, and is provided with a recess at its outer end adapted to engage one of the outer clotheslines. Preferably the recess is facing longitudinally outward from the end of the pin, and exceeds in width the thickness of the line to be grasped, and the body of the pins extending on either side of the recess preferably constitutes two legs of unequal length, of which the upper leg will be the longer in the operative position of the pin. A leaf spring is pivotally connected to the pin in a recess near the outer end thereof and extends in a curve above the body of the pin and down to the center line, engaging said line by means of an integral hook formation. The spring thus urges the pin away from the center line and toward the outer line, and is compressed when clothes are being inserted or removed from the recess at the outer end. When the pressure from the outer end is removed, the spring again urges the pin toward the outer line, firmly engaging the clothes between the line and pin.

Other objects of this invention will in part be obvious and in part hereinafter pointed out. The invention accordingly consists in the features of construction, combinations of elements and arrangements of parts which will be exemplified in the constructions hereinafter described. In the accompanying drawing, in which is shown one of the various possible illustrative embodiments of this invention, Figure 1 is a plan view of the system.

Figure 2 is a sectional view on the line 2—2 of Figure 1.

Figure 3 is a side elevational view of the spring means for tensioning the center line.

Figure 4 is an end elevational view of the same.

Referring now in detail to the drawings, my improved system 10 comprises a standard 11 at each end thereof for supporting the lines 12, 13, 14, which may be of any conventional material suitable for clothesline use. The standards 11 are supported firmly against physical displacement by means not shown, it being understood that lines 12, 13, 14 must be under tension for the successful practice of my invention.

The lines 12, 13, 14, extend substantially parallel and in a common flat plane as best shown in Figure 2. For tensioning the lines, I prefer to use turnbuckles 15, 16 on the outer lines, and two extension coil springs 17, 18 for the central line 13. A ring 19 is immediately connected to line 13, and the spring 17 extends from ring 19 to a tie bar 20 engaging a slot 21 in the cross bar 22 of standard 11. Spring 18 is heavier than spring 17 and extends angularly downward from ring 19 to eye bolt 23 on standard 11.

The clothespins 25, 26, 27, 28 are identical, and loosely and slidingly engage central line 13, which extends through the elongated holes or eyes 29 which extend through the pins near the inner end thereof and substantially longitudinally thereof.

The elongated body 30 of pins 25, 26, 27, 28 is of rigid, non-resilient construction, and preferably of rectangular cross section. At the outer end of the pin is located the longitudinally extending, outward facing recess 31 adapted to engage the outer lines 12, 14, and it is notable that the width of recess 31 is greater than the diameter of lines 12, 14, so that no compressive action is exerted upon lines 12, 14, by the legs 32, 33 extending on either side of recess 31 and defining the same and constituting a longitudinally extending fork. The upper leg 32 is preferably longer than the lower leg 33.

Leaf springs 34 are pivotally connected to pin body 30 near the outer end thereof by the pins or screws 35, further being located in recesses 36 substantially equal in width to springs 34, so that when viewed in plan, as in Figure 1, spring 34 is within the outline of body 30.

Spring 34 engages pins 35 by means of an integral hook formation 37, and further engages line 13 by means of the integral hook 38. The inner end of spring 34, including hook 38, is set in recess 39 which is longitudinally coincident with hole 29. As best seen in Figure 2, hook 38 is coincident with hole 29, and is maintained coincident therewith by its engagement with line 13. The inner end of spring 34, and principally hook 38, being confined in longitudinal movement by the limit of hole 29, is further laterally confined in recess 39 by the disk 40 mounted on pin 41 in body 30 for the purpose of so laterally confining spring 34.

It should be mentioned that, in Figure 2, the lines of the pin 26 hidden by pin 25 have been omitted from the drawing in order not to confuse.

In operation, the pins 25, 26, 27, 28 are preferably positioned in pairs along line 13, as illustrated. A pin may be disengaged from the outer line 12 or 14 by inward pressure on its leg 32 and then upward pivotal movement around line 13, permitting clothes to be placed along the inner boundary of lines 12, 14, whereupon pin 25, for instance, is returned to a horizontal position and permitted to spring outward to the illustrated position. The clothes will then be gripped between the line and pin without any compressive action resulting from the inner surfaces of legs 32, 33, as in an ordinary clothespin, the pressure resulting in my improved pin from the action of spring 34 urging the pin body longitudinally outward against lines 12, 14 and existing between the lines 12, 14 and the bight of the fork formed by legs 32, 33. There is thus no tendency of the clothes and line to split open pin body 30 as presently happens in resilient wooden clothespins. Furthermore, the pins are always in place and require very little effort for the operation of engaging the clothes.

It will thus be seen that there is provided a device in which the several objects of this invention are achieved, and which is well adapted to meet the conditions of practical use. As various possible embodiments might be made of the above invention, and as various changes might be made in the embodiments above set forth, it is to be understood that all matter herein set forth or shown in the accompanying drawing is to be interpreted as illustrative and not in a limiting sense.

What is claimed is:

1. A clothesline and pin system comprising, in combination, a plurality of clotheslines, means maintaining said lines in tension in parallel spaced relation, an elongated clothespin body, said body being formed adjacent one end with a longitudinally extending elongated eye, said body being loosely mounted on one of said clotheslines by means of said eye, said body further being formed at its opposite end with a longitudinally outward facing recess defining and constituting a fork, said recess exceeding in width the diameter of another of said clotheslines, and resilient means engaging said first mentioned clothesline and said clothespin and urging the latter toward said other clothesline, whereby said clothespin is adapted to grip clothes between said other clothesline and the bight of said fork by pressure exerted longitudinally of said clothespin body.

2. A clothespin for use with two clotheslines maintained under tension in parallel spaced relation, said clothespin comprising an elongated body, said body being formed adjacent one end thereof with a longitudinally extending elongated eye by means of which said clothespin may be loosely mounted on one of said clotheslines, said body comprising at its other end a longitudinally outward facing fork, said clothespin further comprising resilient means mounted on said body and so constructed and arranged as to engage said first mentioned clothesline and urge said body away therefrom, whereby said clothespin is adapted to grip clothes between the second clothesline and the bight of the fork, and the clothes may be released by displacing the clothespin toward said first mentioned clothesline.

3. A clothespin according to claim 2, said resilient means comprising a leaf spring comprising an integral hook at each end thereof, said spring being pivotally connected to said body adjacent said fork by means of one of said hooks, the other of said hooks extending in longitudinal coincidence with said eye.

NORRIS EVERS FAZENBAKER.

REFERENCES CITED

The following references are of record in the file of this patent:

UNITED STATES PATENTS

| Number | Name | Date |
|---|---|---|
| 561,634 | Walsh et al. | June 9, 1896 |
| 607,883 | Renfrow | July 26, 1898 |
| 615,314 | Smith | Dec. 6, 1898 |
| 1,222,510 | Zirkle | Apr. 10, 1917 |
| 1,302,771 | Cunningham et al. | May 6, 1919 |
| 1,368,839 | Richards | Feb. 15, 1921 |
| 1,489,923 | Budd | Apr. 8, 1924 |
| 1,899,982 | Olson | Mar. 7, 1933 |
| 2,234,624 | Davis | Mar. 11, 1941 |